Patented Dec. 18, 1928.

1,695,666

UNITED STATES PATENT OFFICE.

KARL SCHIRMACHER AND FRIEDRICH STOLZ, OF HOCHST-ON-THE-MAIN, AND HANS SCHLICHENMAIER AND WALTER KROHS, OF SODEN-ON-THE-TAUNUS, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS OF PRODUCING A NEW CATALYST.

No Drawing. Application filed July 19, 1926, Serial No. 123,591, and in Germany July 22, 1925.

Through a great number of pertinent publications it is known that nickel, particularly in the form of a fine precipitate, when used on a substratum is well suited for carrying out catalytic reductions of any kind. But it is also known that certain reductions cannot be effected by means of a catalyst consisting merely of nickel or that they can only be carried out at a very high temperature and then only with a very low yield of heterogeneous final products. For the above stated reasons a number of methods have been proposed by which it is possible to obtain considerably better reductions, namely if instead of the pure nickel mixtures thereof with other metals are used, for instance with those of the iron- or silver groups. But also in such cases the operations must generally be carried out at a high temperature.

Now we have found that it is possible to effect the said reductions such as hydrogenizing processes at a lower temperature and within a considerably shorter time, if when using for this purpose metals acting as catalysts such as nickel alone or nickel mixed with a metal of the above mentioned groups, the precipitation of the metal compounds or the mixtures thereof on the carrier is effected not in a fine colloid-like form but in an extremely fine crystalline form.

Our experiments have proved that this highly-active form of the catalyst is obtained if the preciptation of the nickel compounds on the carriers is carried out in the heat either in the presence of ammonia with air as a hydroxide or with a soluble carbonate as a carbonate and so slowly that the separating bodies have sufficient time to separate in a crystalline form, whereupon the nickel compound which precipitates on the carrier is treated with hydrogen at a rather high temperature preferably up to 550° C. The carbonates of the alkalies have proved to be a most suitable precipitant for the nickel compounds. When using ammonia compounds of these metals it is advantageous to effect the precipitation by carbonated air. Also such nickel compounds in a crystalline form may be employed, which contain a residue which is eliminated by heating with hydrogen.

Furthermore, it is necessary, when reducing the metal compounds for instance carbonates with hydrogen, to raise the temperature to such a high degree that a complete reduction of the crystalline salts to the metallic nickel is attained. For this purpose it is necessary to work at temperatures up to 450° and above.

The catalysts thus obtained are exceedingly active so that they permit in many cases to reduce or to add hydrogen even at temperatures below 100° C., whereby homogeneous compounds are obtained. The great technical progress of our new process lies in the fact that there are required for the reduction only relatively low temperatures, that the duration of the reduction is considerably shortened and that for the reduction of a number of useful compounds, which could only be carried out hitherto by means of catalysts prepared from the noble metals, now there can be used a cheap metal catalyst.

Furthermore the nickel catalyst prepared in the described manner has the very important property of being resistant against poisoning influences, for instance against halogen or sulfur.

The catalysts prepared by our new process give good results even in such cases where they could not be obtained hitherto; in other cases it is possible to increase considerably the yield. For instance there is obtained from acetone even at 40–70° C. in a very short time a yield of about 95% of isopropylalcohol; from acetonitrile—which according to Braun (see Berichte der deutschen chem. Gesellschaft, vol. 56, page 1993) can be reduced only with great difficulty and to undefinable substances—there is obtained even at 70° C. a product consisting chiefly of monoethylamine and from pyridine at 110° piperidine with an almost quantitative yield.

As a proof of the high efficacy of the catalysts thus obtainable may be mentioned that when using them hydrogenating-processes can be carried out which could not hitherto be performed when using nickel as catalyst, for instance: The reduction of pyridine and piperidine, the reduction of ketocarboxylic acids to diphenylmethancarboxylic acids, the reduction of ketocarboxylic acid esters to $\beta$-oxybutyric acid esters, the reduction of aliphatic nitriles to primary amines. Furthermore hydrogenating- and reducing processes, which hitherto had very unsatisfactory results, are considerably improved, for instance the reduction of aromatic nitriles to amines, of nitro-, nitroso-, azoxy- and azo compounds to amines, of acetylene- and ethylene compounds to paraffin compounds, of aromatic, cyclic and isocyclic double linkages to simple linkages. These reductions can be effected at a lower temperature, in a shorter time and with better yields than it has been possible heretofore. Owing to its extremely high efficacy our new catalyst is particularly useful in cases where graduated reductions are to be effected. This is rendered possible by the fact that the various degrees of temperature as they are required for the reduction of the respective groups, are sufficiently distant from each other when using our catalyst. In all the above mentioned cases when using the said catalyst no mixtures, but homogeneous substances are obtained. All those reductions can be carried out in practice in a very simple manner. They may be carried out either in absence of a solvent and when the bodies are in a molten state, for instance in the case of the reduction of benzophenone to diphenylmethane of acetophenone to ethylbenzene, of naphthonitrile to phenylmethylamine, of indone to hydrindone, of anisol to hexanitroanisol; or in the presence of a solvent, as for instance water, alcohol, aniline, decaline, chlorbenzene etc. Compounds capable of forming water-soluble salts, such as carboxylic acids, sulfonic acids, nitro-phenols, may be reduced in the form of their salts. Difficultly soluble compounds may be reduced in an aqueous or alcoholic suspension. The reduction occurs in this case very easily too. The pressures and temperatures required for the reductions in question, are extremely low. It will be sufficient on the average to use a pressure of 15 atmos. while the temperature may be in most cases below 100° C.

The following examples illustrate our invention, but are not intended to limit it thereto, all parts being by weight:

1. 290 parts of nickel nitrate in 3000 parts of water are mixed with 660 parts of an ammonia solution of 25% strength and then 50 parts of a finely powdered silicic acid gel are added. The mixture is heated to 70° C. and a vigorous current of air, free from any particles of dust, is passed through. The temperature and the volume of the mixture must be kept constant during the passage of the air current. After about 4 hours the precipitation of the nickel is complete. The precipitate is filtered off by suction, washed free from nitrate and dried at about 100°. After being pulverized, the precipitate forms an extremely fine crystalline flour-like substance.

70 parts of the powder so obtained are charged into a wide reduction pipe. The pipe is then heated at first to 100–130° C., while slowly passing hydrogen through it. When the formed water does no more escape as vapour, the temperature is gradually raised during 5–6 hours to 415–420° C. This temperature is maintained until no further formation of water can be detected. Thereupon the pipe is quickly cooled and the catalyst with the hydrogen is still passing over it, is poured into a suitable suspending agent such as water, pyridine, decaline. It forms a deep black substance consisting of extremely fine flakes and depositing very slowly.

2. 290 parts of nickel nitrate are dissolved in 1000 parts of water and 50 parts of silicic acid gel are added. The resulting mixture is heated to 70° C. and 106 parts of sodium carbonate, dissolved in 3000 parts of water, are added by drops within 8 hours while stirring. The precipitate thus formed is further treated and reduced as indicated in Example 1.

3. 250 parts of nickel nitrate, 70 parts of cobalt nitrate and 10 parts of copper nitrate are dissolved in 2000 parts of water, then mixed with 50 parts of absolutely pure silicic acid gel. The resulting mixture is heated to approximately 70° C. There is then added while stirring well within 8 hours the calculated quantity of a solution of sodium carbonate of 3¼% strength, during which operation the temperature is to be kept at 70°. The precipitated carbonates are filtered off by suction, the filtrates are washed free from nitrate, dried at about 100° C. and the resulting substance, which forms an extremely fine powder is reduced as indicated in Example 1.

4. 55 parts of propionitrile mixed with one part of the nickel catalyst are subjected in an autoclave provided with a stirrer to a hydrogen pressure of 15 atm. The mass in the vessel is heated, the pressure rises at first slowly and at 60° there is a lively absorption of hydrogen. The pressure is allowed to go down to 5 atm. whereupon each time the pressure is raised again by introducing fresh hydrogen to 15 atm. The temperature at which the reduction occurs lies at about 80°. In the course of 2 hours the hydrogen absorption is complete. The content of the bomb, after being cooled, is filtered off by suction, washed with ether and the normal propylamine, which crystallizes well, is precipitated by means of gaseous hydrochloric acid in the form of its hydrochloride. The analysis shows that the product is a pure primary hydrochloride. The yield amounts to about 80% of the theory. In the same manner as propionitrile were reduced acetonitrile, benzylcyanide, paranitrobenzylcyanide and α-naphthonitrile with a yield of 95%, respectively 63% of primary and 18% of secondary base, 50% of primary base, 70% of primary base and 20% of secondary base.

5. 500 parts of pyridine are hydrogenated in the presence of 30 parts of the catalyst in an autoclave at a temperature of 130–180° and at a pressure of 20–40 atm. After 3 hours, the absorption of hydrogen is complete. The catalyst is isolated from the mass by decantation and the piperidine is fractionated.

Like piperidine also quinaldine, 2-methyl-5-ethylpyridine, and α-α-lutidine-β-carboxylic acid methylester and dihydrolutidinedicarboxylic acid ester were completely hydrogenated.

6. 105 parts of aceto acetic ester and 5 parts of the nickel catalyst are subjected in an autoclave provided with a stirrer to a hydrogen pressure of 20 atm. and slowly heated. The absorption of hydrogen sets in at 90°, the temperature is then raised to 110°. The pressure is allowed to go down to 10 atm. and is then raised each time to 20 atm. by introducing fresh hydrogen, until no further absorption of hydrogen takes place. The reduction is complete in about 30 minutes. After cooling, the catalyst is filtered off by suction and distilled. Thus there is obtained besides some β-oxytutyric acid pure β-oxybutyric acid ester in a very good yield.

7. 244 parts of p-toluylbenzoic acid are dissolved in 53 parts of sodium carbonate and 1000 parts of water. This solution is mixed with 7 parts of the nickel catalyst and subjected in an iron pressure bomb provided with a stirrer to a hydrogen pressure of 20 atm. The mass is heated whereupon the hydrogen absorption sets in at 46° C. whilst the pressure begins to fall. The temperature is then raised to 110° C. and the pressure is allowed to go down to 10 atm. and then again raised each time to 20 atm. by introducing fresh hydrogen. After about 4 hours the hydrogen absorption ceases. The nickel catalyst is then filtered off by suction and from the clear filtrate the toluylphenylmethan-carboxylic acid is obtained by acidification. This acid is almost pure and can be obtained in an absolutely pure state by a single recrystallization from alcohol. The yield amounts to about 95%.

8. 26,4 parts (1/10 molecule) of o-nitrotoluylbenzoic acid of the formula:

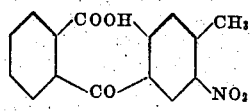

are dissolved in 5,3 parts of sodium carbonate and 200 parts of water and treated in the manner indicated in Example 4 with hydrogen in the presence of one part of the nickel catalyst. The reduction of the nitro group begins already at 30° C. The pressure goes down and remains constant when the hydrogen required for the reduction of the nitro group to the amino group has been absorbed. The reduction of the keto group to the methane group requires a higher temperature. The mass is heated to 110° and the pressure is again raised to 20 atm. The hydrogen is quickly absorbed and the pressure, after the calculated quantity of hydrogen is consumed (2/10 molecule) remains constant. After cooling the catalyst is filtered off by suction and by means of acetic acid the diaminomethyldiphenylmethan-o-carboxylic acid is precipitated as a mass which is at first soft but soon solidifies into crystals. Recrystallized from benzene, the acid melts at 135–136°. It is difficulty soluble in water, more readily soluble in benzene and very readily soluble in alcohol; the yield amounts to over 90% of the theory.

In an analogous manner there is reduced 4,4-dimethoxy-2.2′-dinitrodiphenlyketone to 4.4′-dimethoxy-2.2′-diaminodiphenylmethane in a quantitative yield; 4-methyl-3-nitrodiphenylketone to 4-methyl-2-aminodiphenylmethane in a very good yield, 4.4′-dimethyl-3′-nitrodiphenylketone to 4.4′-dimethyl-3′-diphenylmethane, benzophenone to diphenylmethane and acetophenone to ethylbenzene.

That this nickel catalyst, which is insensitive and yet highly active, is of great value for technical purposes is also evident from the fact that through its medium it is possible to prepare from nitro-, nitroso-, azo-azooxy compounds a great number of the technically valuable amines at temperatures varying between 20 and 90° and in a very short time, the reaction velocity being almost constant.

9. 500 parts of p-nitraniline, suspended in 1500 parts of water, are mixed with 5 parts of nickel and treated with hydrogen in the manner above described. The absorption of the hydrogen sets in at 40° and proceeds so energetically, that the heating must be discontinued at 60° C. If an average pressure of 10–15 atm. and a temperature of 70–80° is maintained, the reaction is finished in 3/4 hour. The product being worked up an almost quantitative yield of pure paraphenylenediamine is obtained.

10. 33,4 parts of p-nitrobenzoic acid, dissolved in 10,6 parts of sodium carbonate and 100 parts of water, are mixed with 0,5 parts of the nickel catalyst and treated in the above described manner with hydrogen. The absorption of the hydrogen begins at room temperature and is completed in a short time. The product after being worked up is obtained with an almost quantitative yield of entirely pure p-aminobenzoic acid.

In an analogous manner the following compounds can be reduced in a very short time and at temperatures below 100° to the corresponding amines with a very good yield: α-nitronaphthalene, meta-dinitrobenzene, o-nitrophenol, 2-nitro-4-cresol, o-nitrochlorobenzene, 1.4-chlornitronaphthalene, potassium o-nitrobenzenesulfonate, o-nitroacetanilide, 2-nitro-1-oxy-4-benzoic acid ester, 1.5- nitronaphthoic acid and 1.8-nitronaphthoic acid, p-nitroacetanilide, nitro-2.5-dichlorobenzene, benzeneazosalicylic acid, azoxybenzene, 5-nitroacenaphthene, m-nitro-m'-carbomethoxy-p'-oxybenzophenone, o-nitro-p-cresolcarbonate, 4-chloro-2-nitrophenol.

11. 5000 parts of crotonic aldehyde, mixed with 60 parts of the nickel catalyst, are subjected in a stirring-drum to a hydrogen pressure of about 20 atm. pressure. The pressure begins to diminish even at room temperature. The temperature rises quickly and the absorption of the hydrogen proceeds energetically so that there must be taken care for a sufficient cooling. Thus the temperature is maintained at 50° while the pressure is allowed to go down each time from 25 to 15 atm. Towards the end of the operation the temperature is raised to 50–60° C. The absorption of the hydrogen is complete in about 4 hours.

The catalysts of the present invention may be characterized as loose black powders, which form water when treated with hydrogen and oxygen at ordinary temperatures, reduce acetonitrile to ethylamine at a temperature of about 70° to 80° C., and, in the dry state, spontaneously ignite when brought into contact with the air.

In the following claims the term "substratum" is to be understood as an inert, non-reducible material such as, for instance, kieselguhr, asbestos, or pumice stone.

Claims:

1. A process of making a highly active nickel catalyst which comprises subjecting to reduction a finely crystalline nickel compound associated with an inert substratum.

2. A process of making a highly active nickel catalyst which comprises subjecting to reduction a finely crystalline nickel compound of the formula $Ni=X$, wherein X represents $(OH)_2$ or $CO_3$, associated with an inert substratum.

3. A process of making a highly active nickel catalyst which comprises subjecting to reduction a finely crystalline nickel carbonate compound associated with an inert substratum.

4. A process of making a highly active nickel catalyst which comprises subjecting a finely crystalline nickel compound of the formula $Ni=X$, wherein X represents $(OH)_2$ or $CO_3$, associated with an inert substratum, to reduction with hydrogen.

5. A process of making a highly active nickel catalyst which comprises subjecting a finely crystalline nickel compound of the formula $Ni=X$, wherein X represents $(OH)_2$ or $CO_3$, associated with an inert substratum, to reduction with hydrogen, at a temperature between 400 and 600° C.

6. A process of making a highly active nickel catalyst which comprises subjecting a finely crystalline nickel carbonate compound, associated with an inert substratum, to reduction with hydrogen at a temperature of between 400° and 600° C.

7. A process of making a highly active nickel catalyst which comprises precipitating a nickel compound of the formula $Ni=X$, wherein X represents $(OH)_2$ or $CO_3$, in finely crystalline form, in the presence of an inert substratum, and thereupon subjecting said compound to reduction with hydrogen at a temperature of between 400° and 600° C.

8. A process of making a highly active nickel catalyst which comprises precipitating in finely crystalline form a nickel carbonate compound from a dilute solution of a nickel compound, in the presence of an inert substratum, and thereupon subjecting said nickel carbonate compound to reduction with hydrogen at 400° to 600° C.

9. A process of making a highly active nickel catalyst which comprises precipitating in finely crystalline form a nickel carbonate compound from a solution containing from 0.5% to 1.5% of nickel, in the presence of an inert substratum, and thereupon subjecting said nickel carbonate compound to reduction with hydrogen at 400° to 600° C.

10. A process of making a highly active nickel catalyst which comprises precipitating in finely crystalline form a nickel carbonate compound from a solution containing from 0.5% to 1.5% nickel at a temperature between 70° and 80° C., in the presence of an inert substratum, and thereupon subjecting said nickel carbonate compound to reduction with hydrogen at 400° to 600° C.

11. As a new product, a highly active nickel catalyst obtainable by subjecting a finely crystalline nickel compound of the formula $Ni=X$, wherein X represents $(OH)_2$ or $CO_3$, associated with an inert substratum to reduction with hydrogen at a temperature between 400° and 600° C.

12. As a new product, a nickel-catalyst comprising active nickel material associated with an inert substratum, which catalyst is a loose black powder, and which forms water when treated with hydrogen and oxygen at ordinary temperatures, reduces acetonitrile to ethylamine at a temperature of about 70° to 80°, and, in the dry state spontaneously ignites when brought into contact with the air.

In testimony whereof, we affix our signatures.

KARL SCHIRMACHER.
FRIEDRICH STOLZ.
HANS SCHLICHENMAIER.
WALTER KROHS.